(12) United States Patent
Lum et al.

(10) Patent No.: US 10,037,620 B2
(45) Date of Patent: Jul. 31, 2018

(54) PIECEWISE LINEAR IRREGULAR RASTERIZATION

(71) Applicant: NVIDIA CORPORATION, Santa Clara, CA (US)

(72) Inventors: Eric B. Lum, San Jose, CA (US); Justin Cobb, Chuluota, FL (US)

(73) Assignee: NVIDIA CORPORATION, Santa Clara, CA (US)

( * ) Notice: Subject to any disclaimer, the term of this patent is extended or adjusted under 35 U.S.C. 154(b) by 307 days.

(21) Appl. No.: 14/726,381

(22) Filed: May 29, 2015

(65) Prior Publication Data
US 2016/0350965 A1 Dec. 1, 2016

(51) Int. Cl.
*G06K 9/00* (2006.01)
*G06T 15/00* (2011.01)
*G06T 11/40* (2006.01)

(52) U.S. Cl.
CPC ............ *G06T 15/005* (2013.01); *G06T 11/40* (2013.01)

(58) Field of Classification Search
CPC ............................. G06T 15/005; G06T 11/40
See application file for complete search history.

(56) References Cited

U.S. PATENT DOCUMENTS

| | | | | |
|---|---|---|---|---|
| 5,422,653 A * | 6/1995 | Maguire, Jr. | ...... | G02B 27/2228 345/9 |
| 2002/0000988 A1 * | 1/2002 | Nelson | .................... | G06T 11/40 345/443 |
| 2002/0005854 A1 * | 1/2002 | Deering | ................ | G06T 15/005 345/596 |
| 2002/0033828 A1 * | 3/2002 | Deering | ................ | G06T 15/005 345/502 |
| 2003/0011609 A1 * | 1/2003 | Deering | .................... | G06F 3/14 345/582 |
| 2012/0086715 A1 * | 4/2012 | Patel | ....................... | G06T 11/40 345/441 |
| 2014/0098084 A1 * | 4/2014 | Subag | ..................... | G06T 11/40 345/419 |

(Continued)

OTHER PUBLICATIONS

Guenter, Brian, et al. "Foveated 3D graphics." ACM Transactions on Graphics (TOG) 31.6 (2012): 164.*

(Continued)

*Primary Examiner* — Jonathan S Lee
(74) *Attorney, Agent, or Firm* — Artegis Law Group, LLP

(57) ABSTRACT

One embodiment of the present invention includes a method for rendering a geometry object in a computer-generated scene. A screen space associated with a display screen is divided into a set of regions. For each region; a first sampling factor in a horizontal dimension is computed that represents a horizontal sampling factor for pixels located in the region, a second sampling factor in a vertical dimension is computed that represents a vertical sampling factor for the pixels located in the region, a first offset in the horizontal dimension is computed that represents a horizontal position associated with the region, and a second offset in the vertical dimension is computed that represent a vertical position associated with the region. When the geometry object is determined to intersect more than one region, an instance of the geometry object is generated each region that the geometry object intersects.

19 Claims, 10 Drawing Sheets

(56) References Cited

U.S. PATENT DOCUMENTS

| | | | | |
|---|---|---|---|---|
| 2014/0253555 | A1* | 9/2014 | Lum | G06T 5/006 |
| | | | | 345/428 |
| 2015/0287158 | A1* | 10/2015 | Cerny | G06F 3/013 |
| | | | | 345/553 |
| 2015/0287165 | A1* | 10/2015 | Berghoff | G06T 3/40 |
| | | | | 345/426 |
| 2015/0287166 | A1* | 10/2015 | Cerny | G02B 27/0172 |
| | | | | 345/423 |
| 2016/0358299 | A1* | 12/2016 | Toth | G06T 19/006 |
| 2017/0024926 | A1* | 1/2017 | Duvvuru | G06T 15/005 |
| 2017/0316544 | A1* | 11/2017 | Cerny | G06T 17/20 |
| 2018/0047129 | A1* | 2/2018 | Cerny | G09G 5/14 |

OTHER PUBLICATIONS

Toth, Robert, Jim Nilsson, and Tomas Akenine-Möller. "Comparison of projection methods for rendering virtual reality." Proceedings of High Performance Graphics. Eurographics Association, 2016.*
Whiting, "Integrating the Oculus Rift into Unreal Engine 4", 6 pages, http://www.gamasutra.com/blogs/NickWhiting/20130611/194007/Integrating_the_Oculus_Rift_into_Unreal_Engine_4.php.

* cited by examiner

PIECEWISE LINEAR IRREGULAR RASTERIZATION

BACKGROUND OF THE INVENTION

Field of the Invention

Embodiments of the present invention relate generally to computer graphics processing and, more specifically, to piecewise linear irregular rasterization.

Description of the Related Art

Virtual reality (VR) goggles are an increasingly popular device for achieving a more immersive experience when playing computer games, watching three-dimension (3D) movies, or viewing other 3D media content. VR goggles are mounted to the head of the viewer and block out light from the real-world environment. VR goggles typically include two flat display screens, where one display screen is mounted for viewing by the left-eye and the other display screen is mounted for viewing by the right eye. Game content or other 3D media content is transmitted to the two display screens so that the viewer can see the 3D content when wearing the VR goggles. Because the two display screens are mounted some distance in front of the eyes of the viewer, the display screens, by themselves, cannot provide peripheral content to the viewer. In other words, the viewer sees content in front of the eyes, but does not see content above, below, or to the sides of the two display screens.

Consequently, VR goggles also include a non-linear distortion lens in front of each display screen. The distortion lens causes content near a particular location, such as the center, of the display screen to optically converge and causes content near the edges of the display screen to optically diverge. The diverged content is then projected onto the peripheral viewing area of the eyes of the viewer. As a result, the viewer is able to see the 3D content in the periphery of the viewer as well as in front of the viewer, resulting in a more immersive virtual reality experience.

In addition to VR goggles, these techniques are also used for other wide-screen rendering applications, such as curved viewing surfaces that include one or more display screens. Such wide-screen rendering applications include curved high-definition and ultra-high definition display screens for home use and multi-screen tiled displays for industrial applications such as control rooms. In such applications, the viewer-perceived distance between adjacent pixels varies from one portion of the display screen to another, resulting in similar distortion artifacts as those artifacts observed when using VR goggles.

Although non-linear distortion lenses provide the benefit of project content onto the periphery of the view, these distortion lens exhibit the undesirable side effect that objects rendered onto the display screens and projected to the eyes of the viewer are appear to be distorted. One common form of optical distortion is pin-cushion distortion, where the perceived location of a point on an object is closer to the center of the display screen relative to where the point really is located. As a result, objects with straight lines, such as squares and rectangles, appear to have curved edges when viewed via VR goggles. To address this phenomenon, graphics processing units (GPUs) or other processors typically render 3D content intended for viewing with VR goggles by intentionally inducing non-linear barrel distortion, where the perceived location of a point on an object is farther away from the center of the display screen relative to where the point really is located. The induced barrel distortion counteracts the optical pin-cushion distortion, so that the viewer sees undistorted content when wearing VR goggles.

One drawback to the above approach is that content near the center of the display screen is magnified while content near the edges of the display screen are compressed. Consequently, content directly in front of the eyes of the viewer has relatively lower resolution, resulting in loss of detail. In other words, too few pixels are rendered in the center of the display screen relative to the number of rendered pixels needed for a high-quality viewing experience. This loss of detail may be perceived as soft, fuzzy, or blocky video. By contrast, content in the periphery of what the viewer can see has a greater resolution than the resolution needed for high-quality viewing. In other words, more pixels are rendered near the edges of the display screen relative to the number of rendered pixels needed for a high-quality viewing experience, leading to waste of compute resources.

Another drawback to the above approach is that GPUs are usually optimized for rendering content using a linear grid. Because the optical pin-cushion lens distortion is non-linear, ideally, the barrel distortion induced by the GPU during rendering should be non-linear as well. However, rendering using a non-linear grid may result in significantly lower GPU performance relative to rendering using a linear grid.

As the foregoing illustrates, what is needed in the art is more effective approach for rendering of content for VR goggles and other wide-screen rendering applications.

SUMMARY OF THE INVENTION

One embodiment of the present invention sets forth a method for rendering a geometry object in a computer-generated scene. The method comprises dividing a screen space associated with a display screen into a set of regions. The method further comprises, for each region; computing a first sampling factor in a horizontal dimension that represents a horizontal sampling factor for pixels located in the region, computing a second sampling factor in a vertical dimension that represents a vertical sampling factor for the pixels located in the region, computing a first offset in the horizontal dimension that represents a horizontal position associated with the region, and computing a second offset in the vertical dimension that represent a vertical position associated with the region. The method further comprises determining that the geometry object intersects more than one region. The method further comprises generating a first instance of the geometry object for a first region that the geometry object intersects. The method further comprises generating a second instance of the geometry object for a second region that the geometry object intersects.

Other embodiments of the present invention include, without limitation, a computer-readable medium including instructions for performing one or more aspects of the disclosed techniques, as well as a system for performing one or more aspects of the disclosed techniques.

One advantage of the disclosed technique is that pixels located near the edge of the screen space are rendered at lower resolution, leading to improved performance relative to prior wide-screen rendering techniques.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
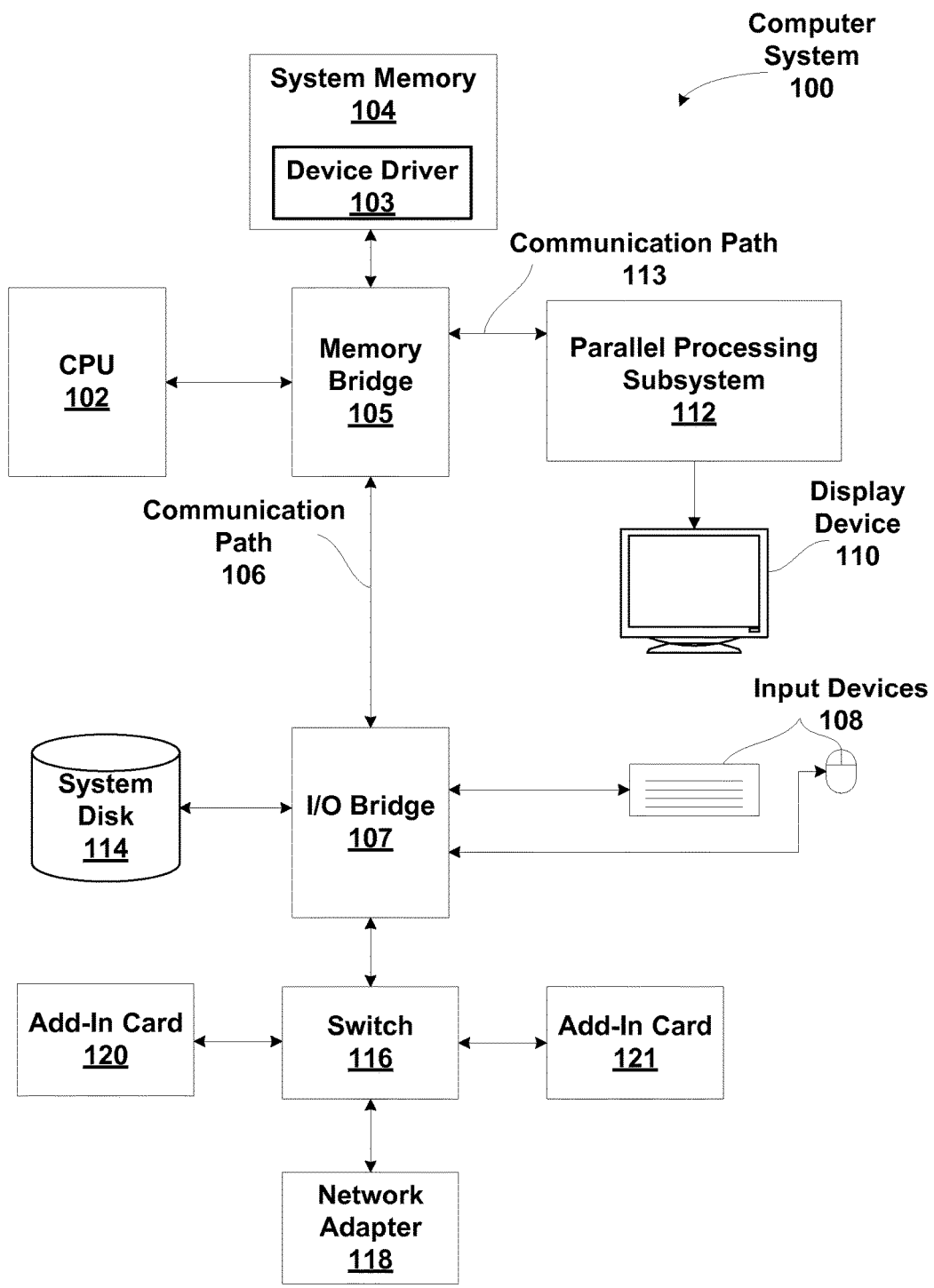
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 is part of a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
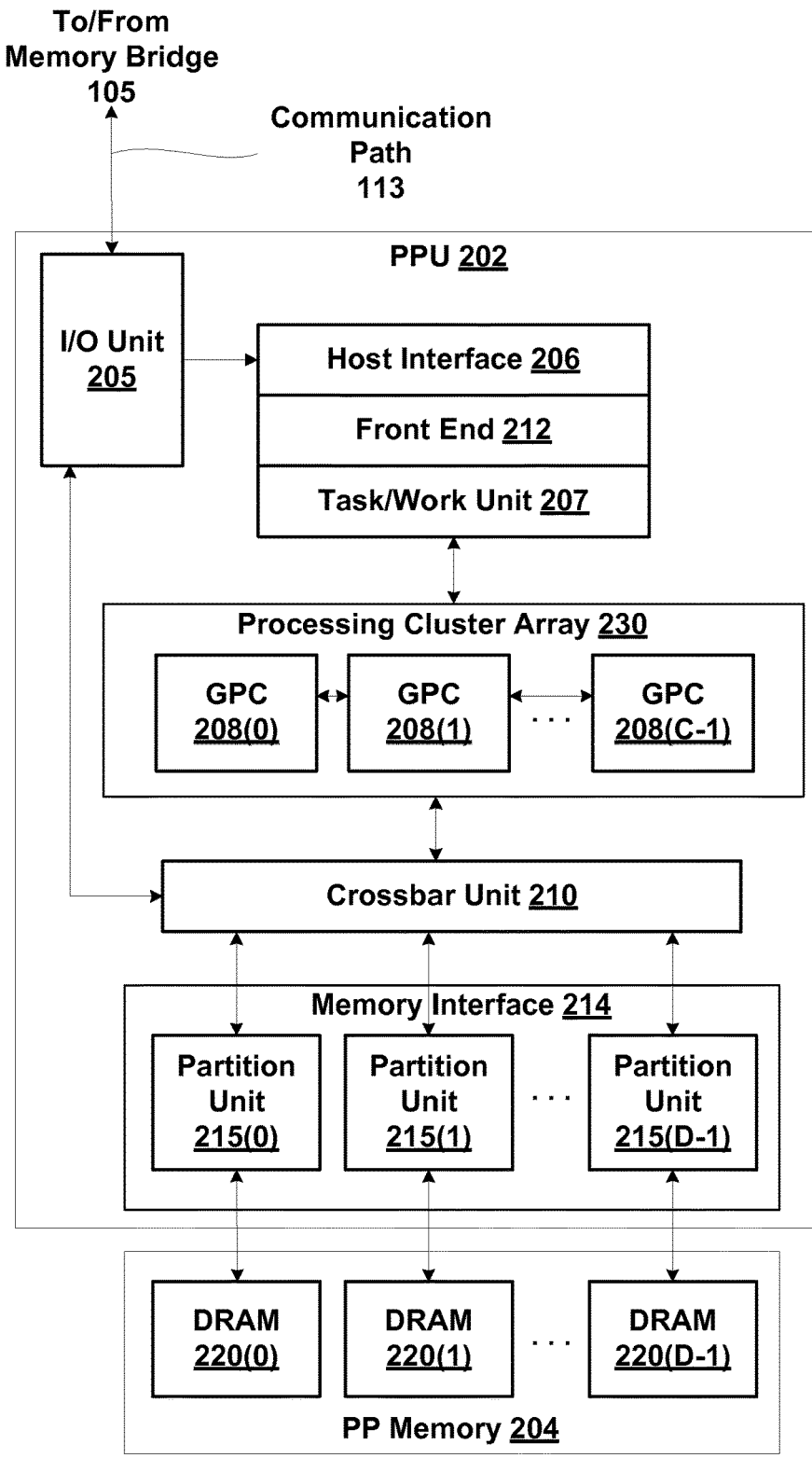
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where $C \geq 1$. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where $D \geq 1$. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Figure 3A:
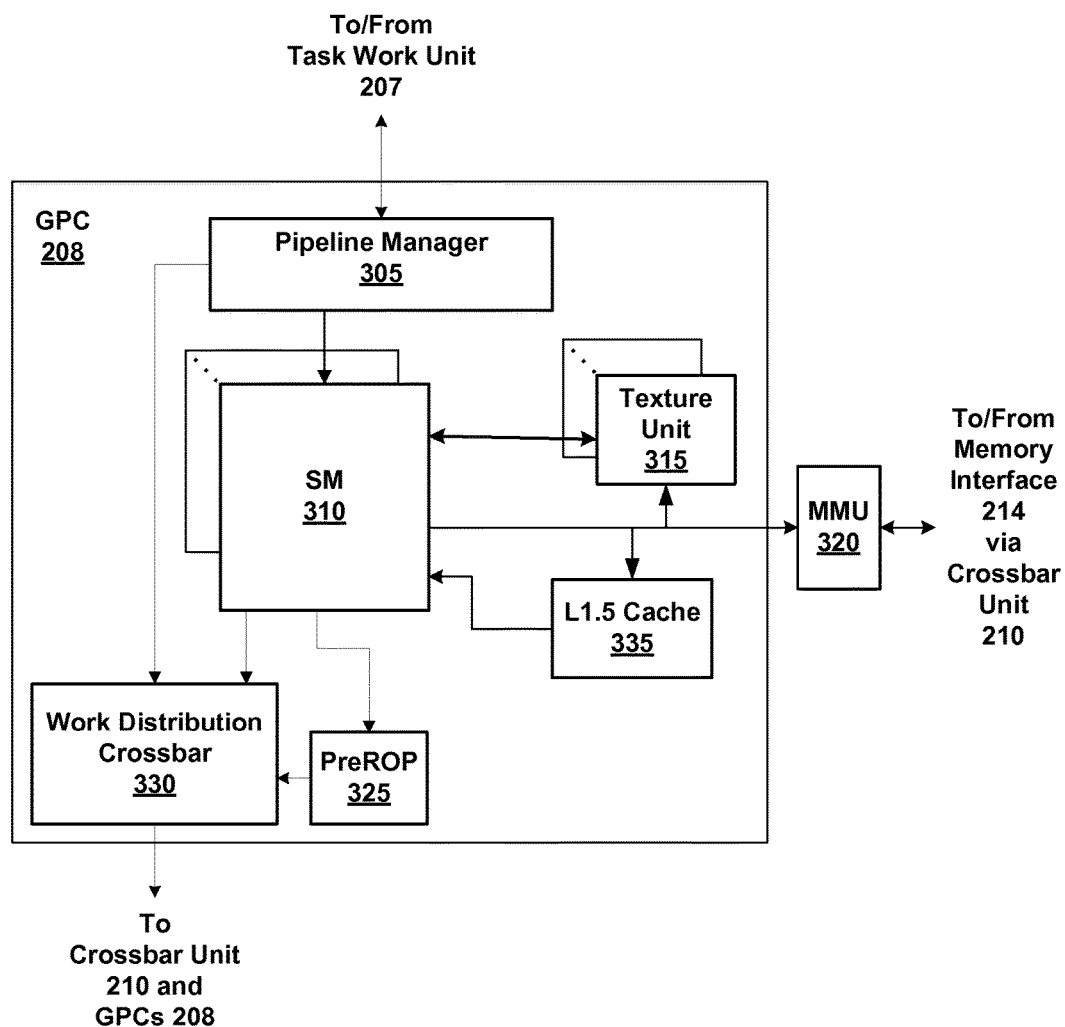
FIG. 3A is a block diagram of a general processing cluster included in the parallel processing unit of FIG. 2, according to one embodiment of the present invention.

FIG. 3A is a block diagram of a GPC 208 included in PPU 202 of FIG. 2, according to one embodiment of the present invention. In operation, GPC 208 may be configured to execute a large number of threads in parallel to perform graphics, general processing and/or compute operations. As used herein, a "thread" refers to an instance of a particular program executing on a particular set of input data. In some embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within GPC 208. Unlike a SIMD execution regime, where all processing engines typically execute identical instructions, SIMT execution allows different threads to more readily follow divergent execution paths through a given program. Persons of ordinary skill in the art will understand that a SIMD processing regime represents a functional subset of a SIMT processing regime.

Operation of GPC 208 is controlled via a pipeline manager 305 that distributes processing tasks received from a work distribution unit (not shown) within task/work unit 207 to one or more streaming multiprocessors (SMs) 310. Pipeline manager 305 may also be configured to control a work distribution crossbar 330 by specifying destinations for processed data output by SMs 310.

In one embodiment, GPC 208 includes a set of M of SMs 310, where M≥1. Also, each SM 310 includes a set of functional execution units (not shown), such as execution units and load-store units. Processing operations specific to any of the functional execution units may be pipelined, which enables a new instruction to be issued for execution before a previous instruction has completed execution. Any combination of functional execution units within a given SM 310 may be provided. In various embodiments, the functional execution units may be configured to support a variety of different operations including integer and floating point arithmetic (e.g., addition and multiplication), comparison operations, Boolean operations (AND, OR, XOR), bit-shifting, and computation of various algebraic functions (e.g., planar interpolation and trigonometric, exponential, and logarithmic functions, etc.). Advantageously, the same functional execution unit can be configured to perform different operations.

In operation, each SM 310 is configured to process one or more thread groups. As used herein, a "thread group" or "warp" refers to a group of threads concurrently executing the same program on different input data, with one thread of the group being assigned to a different execution unit within an SM 310. A thread group may include fewer threads than the number of execution units within the SM 310, in which case some of the execution may be idle during cycles when that thread group is being processed. A thread group may also include more threads than the number of execution units within the SM 310, in which case processing may occur over consecutive clock cycles. Since each SM 310 can support up to G thread groups concurrently, it follows that up to G*M thread groups can be executing in GPC 208 at any given time.

Additionally, a plurality of related thread groups may be active (in different phases of execution) at the same time within an SM 310. This collection of thread groups is referred to herein as a "cooperative thread array" ("CTA") or "thread array." The size of a particular CTA is equal to m*k, where k is the number of concurrently executing threads in a thread group, which is typically an integer multiple of the number of execution units within the SM 310, and m is the number of thread groups simultaneously active within the SM 310.

Although not shown in FIG. 3A, each SM 310 contains a level one (L1) cache or uses space in a corresponding L1 cache outside of the SM 310 to support, among other things, load and store operations performed by the execution units. Each SM 310 also has access to level two (L2) caches (not shown) that are shared among all GPCs 208 in PPU 202. The L2 caches may be used to transfer data between threads. Finally, SMs 310 also have access to off-chip "global" memory, which may include PP memory 204 and/or system memory 104. It is to be understood that any memory external to PPU 202 may be used as global memory. Additionally, as shown in FIG. 3A, a level one-point-five (L1.5) cache 335 may be included within GPC 208 and configured to receive and hold data requested from memory via memory interface 214 by SM 310. Such data may include, without limitation, instructions, uniform data, and constant data. In embodiments having multiple SMs 310 within GPC 208, the SMs 310 may beneficially share common instructions and data cached in L1.5 cache 335.

Each GPC 208 may have an associated memory management unit (MMU) 320 that is configured to map virtual addresses into physical addresses. In various embodiments, MMU 320 may reside either within GPC 208 or within the memory interface 214. The MMU 320 includes a set of page table entries (PTEs) used to map a virtual address to a physical address of a tile or memory page and optionally a cache line index. The MMU 320 may include address translation lookaside buffers (TLB) or caches that may reside within SMs 310, within one or more L1 caches, or within GPC 208.

In graphics and compute applications, GPC 208 may be configured such that each SM 310 is coupled to a texture unit 315 for performing texture mapping operations, such as determining texture sample positions, reading texture data, and filtering texture data.

In operation, each SM 310 transmits a processed task to work distribution crossbar 330 in order to provide the processed task to another GPC 208 for further processing or to store the processed task in an L2 cache (not shown), parallel processing memory 204, or system memory 104 via crossbar unit 210. In addition, a pre-raster operations (preROP) unit 325 is configured to receive data from SM 310, direct data to one or more raster operations (ROP) units within partition units 215, perform optimizations for color blending, organize pixel color data, and perform address translations.

It will be appreciated that the core architecture described herein is illustrative and that variations and modifications are possible. Among other things, any number of processing units, such as SMs 310, texture units 315, or preROP units 325, may be included within GPC 208. Further, as described above in conjunction with FIG. 2, PPU 202 may include any number of GPCs 208 that are configured to be functionally similar to one another so that execution behavior does not depend on which GPC 208 receives a particular processing task. Further, each GPC 208 operates independently of the other GPCs 208 in PPU 202 to execute tasks for one or more application programs. In view of the foregoing, persons of ordinary skill in the art will appreciate that the architecture described in FIGS. 1-3A in no way limits the scope of the present invention.

Graphics Pipeline Architecture

Figure 3B:
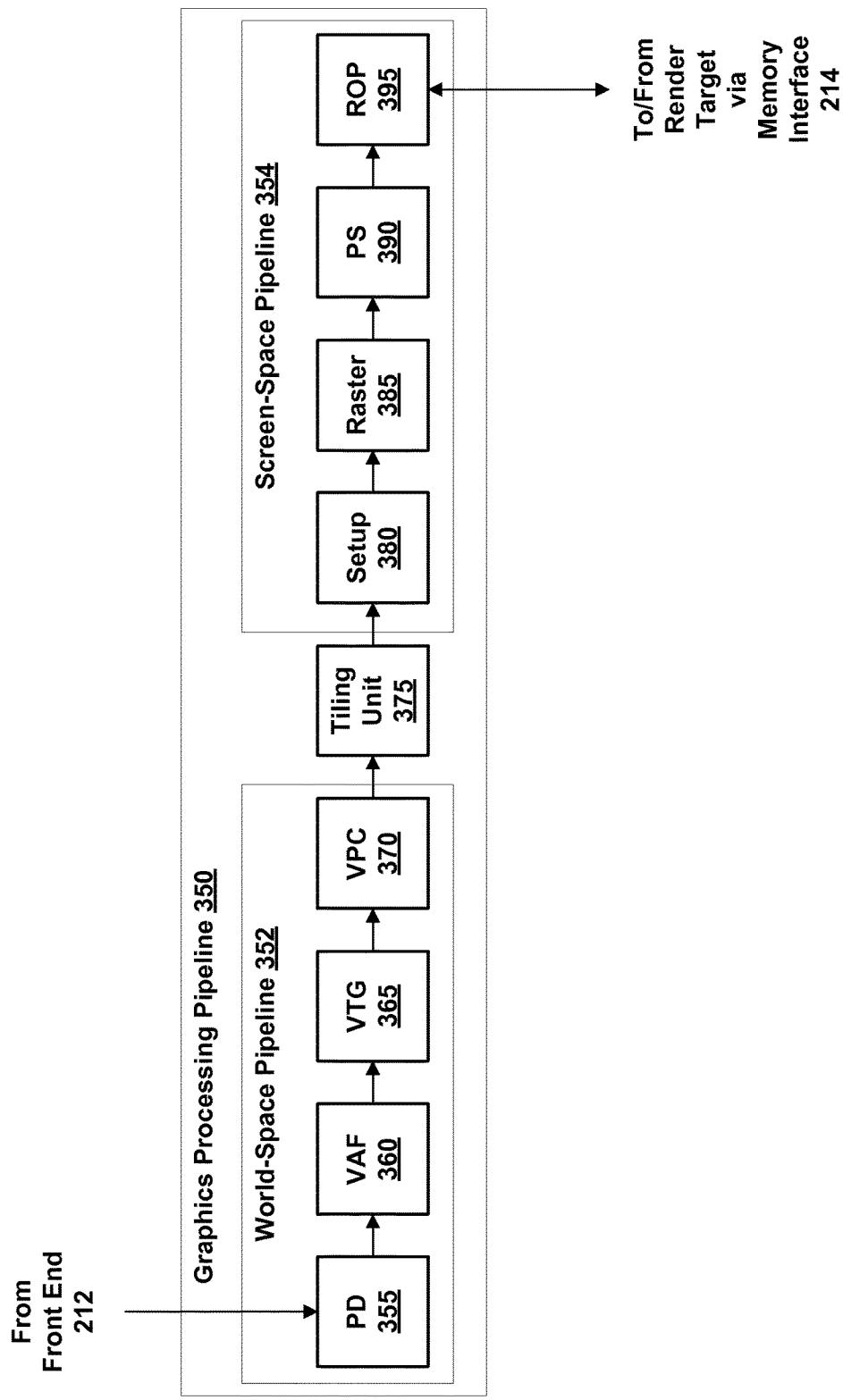
FIG. 3B is a conceptual diagram of a graphics processing pipeline that may be implemented within the parallel processing unit of FIG. 2, according to one embodiment of the present invention.

FIG. 3B is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world-space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world-space pipeline 352 and a screen-space pipeline 354, as further described herein. Graphics primitives are processed in the world-space pipeline 352 and then transmitted to the tiling unit 375. The screen-space is divided into cache tiles, where each cache tile is associated with a portion of the screen-space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world-space pipeline 352, but are then transmitted multiple times to the screen-space pipeline 354.

Such a technique improves cache memory locality during processing in the screen-space pipeline 354, where multiple memory operations associated with a first cache tile access a region of the L2 caches, or any other technically feasible cache memory, that may stay resident during screen-space processing of the first cache tile. Once the graphics primitives associated with the first cache tile are processed by the screen-space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen-space processing of the second cache tile. Accordingly, the overall memory traffic to the L2 caches and to the render targets may be reduced. In some embodiments, the world-space computation is performed once for a given graphics primitive irrespective of the number of cache tiles in screen-space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, one of the SMs 310 of FIG. 3A could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world-space pipeline 352 and a screen-space pipeline 354. The world-space pipeline 352 processes geometry objects in 3D space, where the position of each geometry object is known relative to other geometry objects and relative to a 3D coordinate system. The screen-space pipeline 354 processes geometry objects that have been projected from the 3D coordinate system onto a 2D planar surface representing the surface of the display device 110. For example, the world-space pipeline 352 could include pipeline stages in the graphics processing pipeline 350 from the PD 355 through the VPC 370. The screen-space pipeline 354 could include pipeline stages in the graphics processing pipeline 350 from the setup unit 380 through the ROP 395. The tiling unit 375 would follow the last stage of the world-space pipeline 352, namely, the VPC 370. The tiling unit 375 would precede the first stage of the screen-space pipeline 354, namely, the setup unit 380.

In some embodiments, the world-space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of geometry objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Tiled Caching

Figure 4:
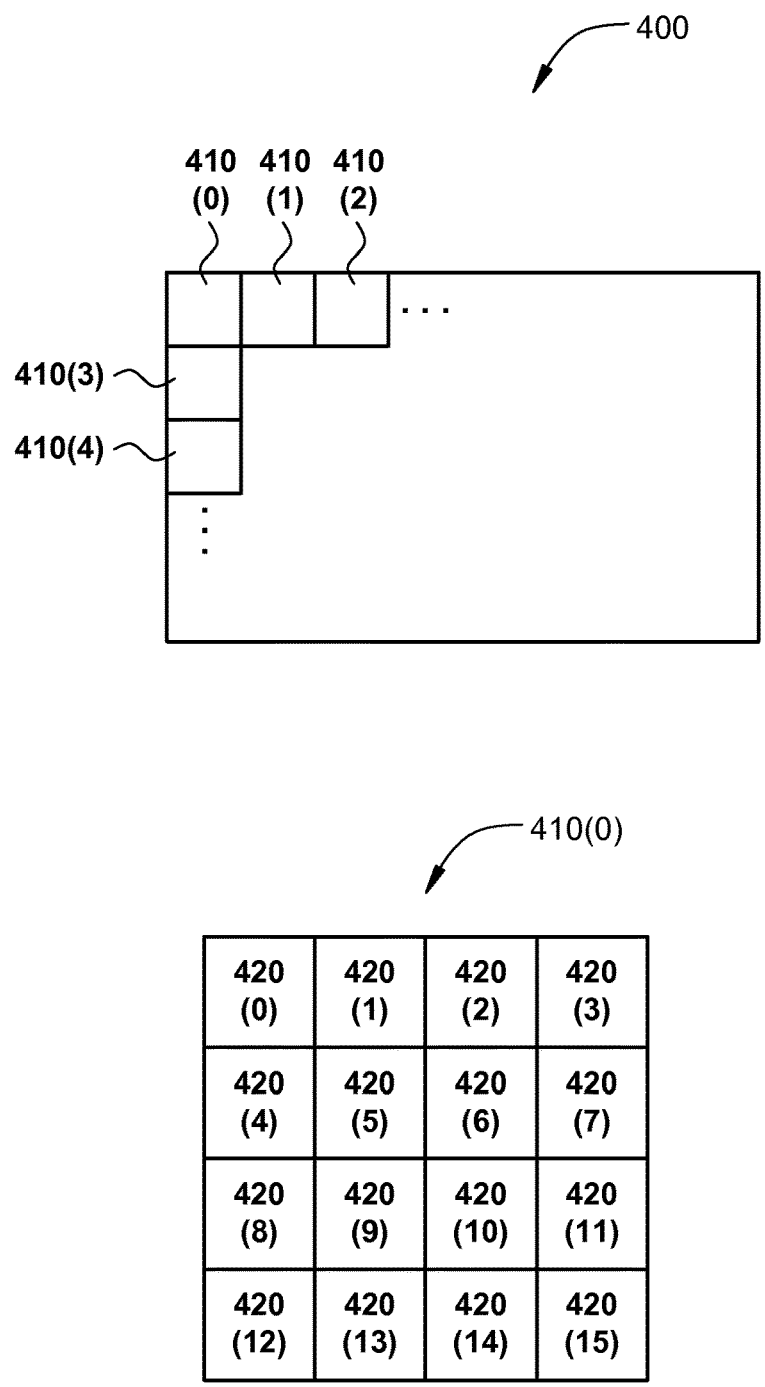
FIG. 4 is a conceptual diagram of a cache tile that the graphics processing pipeline of FIG. 3B may be configured to generate and process, according to one embodiment of the present invention.

FIG. 4 is a conceptual diagram of a cache tile 410(0) that the graphics processing pipeline 350 of FIG. 3B may be configured to generate and process, according to one embodiment of the present invention. As shown, the cache tile 410(0) represents a portion of a screen-space 400 and is divided into multiple raster tiles 420.

The screen-space 400 represents one or more memory buffers configured to store rendered image data and other data transmitted by functional units within the graphics processing pipeline 350. In some embodiments, the one or more memory buffers may be configured as one or more render targets. The screen-space represents a memory buffer configured to store the image rendered by the graphics processing pipeline. The screen-space 400 may be associated with any number of render targets, where each render target may be configured independently of other render targets to include any number of fields. Each field within a render target may be configured independently of other fields to include any number of bits. Each render target may include multiple picture elements (pixels), and each pixel may, in turn, include multiple samples. In some embodiments, the size of each cache tile may be based on the size and configuration of the render targets associated with the screen-space. In operation, once rendering completes, the pixels in the one or more render targets may be transmitted to a display device in order to display the rendered image.

By way of example, a set of render targets for the screen-space 400 could include eight render targets. The first render target could include four fields representing color, including red, green, and blue component colors, and transparency information associated with a corresponding fragment. The second render target could include two fields representing depth and stencil information associated with the corresponding fragment. The third render target could include three fields representing surface normal vector information, including an x-axis normal vector, a y-axis normal vector, and a z-axis normal vector, associated with the corresponding fragment. The remaining five render targets could be configured to store additional information associated with the corresponding fragment. Such configurations could include storage for various information, including, without limitation, 3D positional data, diffuse lighting information, and specular lighting information.

Each cache tile 410 represents a portion of the screen-space 400. For clarity, only five cache tiles 410(0)-410(4) are shown in FIG. 4. In some embodiments, cache tiles may have an arbitrary size in X and Y screen-space. For example, if a cache tile were to reside in a cache memory that also is used to store other data, then the cache tile could be sized to consume only a specific portion of the cache memory. The size of a cache tile may be based on a number of factors, including, the quantity and configuration of the render targets associated with the screen-space 400, the quantity of samples per pixel, and whether the data stored in the cache tile is compressed. As a general matter, a cache tile is sized to increase the likelihood that the cache tile data remains resident in the cache memory until all graphics primitives associated with the cache tile are fully processed.

The raster tiles 420 represent a portion of the cache tile 410(0). As shown, the cache tile 410(0) includes sixteen raster tiles 420(0)-420(15) arranged in an array that is four raster tiles 420 wide and four raster tiles 420 high. In systems that include multiple GPCs 208, processing associated with a given cache tile 410(0) may be divided among the available GPCs 208. In the example shown, if the sixteen raster tiles of cache tile 410(0) were processed by four different GPCs 208, then each GPC 208 could be assigned to process four of the sixteen raster tiles 420 in the cache tile 410(0). Specifically, the first GPC 208 could be assigned to process raster tiles 420(0), 420(7), 420(10), and 420(13). The second GPC 208 could be assigned to process raster tiles 420(1), 420(4), 420(11), and 420(14). The third GPC 208 could be assigned to process raster tiles 420(2), 420(5), 420(8), and 420(15). The fourth GPC 208 would then be assigned to process raster tiles 420(3), 420(6), 420(9), and 420(12). In other embodiments, the processing of the different raster tiles within a given cache tile may be distributed among GPCs 208 or any other processing entities included within computer system 100 in any technically feasible manner.

Piecewise Linear Irregular Rasterization

The graphics processing pipeline 350 may be configured to perform piecewise linear irregular rasterization, where such piecewise linear irregular rasterization approximates the ideal non-linear rasterization needed to reverse the effects of VR goggle distortion lenses or the artifacts of other wide-screen rendering techniques. This piecewise linear irregular rasterization technique is now described.

Figure 5:
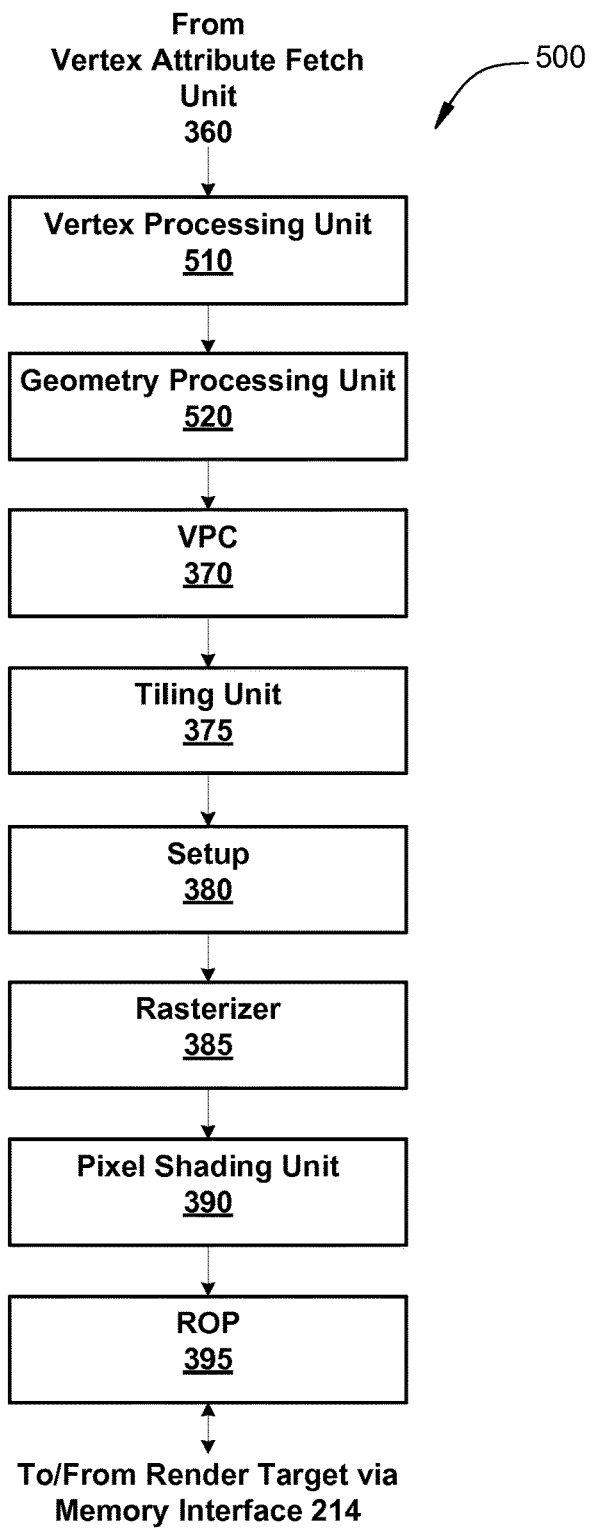
FIG. 5 is a detailed view of a portion of the graphics processing pipeline of FIG. 3B, according to one embodiment of the present invention.

FIG. 5 is a detailed view of a portion 500 of the graphics processing pipeline 350 of FIG. 3B, according to one embodiment of the present invention. As shown, the illustrated portion 500 includes, without limitation, a vertex processing unit 510, geometry processing unit 520; a viewport scale, cull, and clip unit (VPC) 370; a tiling unit 375, a setup unit (setup) 380, a rasterizer 385; a fragment processing unit, also identified as a pixel shading unit 390, and a raster operations unit (ROP) 395. The elements shown in FIG. 5 function substantially the same as described in FIG. 3B except as further described below.

The vertex processing unit 510 receives vertex data and vertex attributes from the VAF 360 and processes the received vertex data and vertex attributes. The vertex processing unit 510 divides the scene into multiple regions, where each region has a different x, y sampling factor and a different x, y offset, where x represents the horizontal dimension of the screen space associated with a display screen and y represents the vertical dimension of the screen space associated with the display screen. In some embodiments, x and y may represent any two dimensions of a screen space where the x dimension forms a right angle with the y dimension. The x, y sampling factor for a region determines the amount to stretch each pixel in the horizontal and vertical dimensions, respectively. The x, y offset determines where to locate the region in screen space in the horizontal and vertical dimensions, respectively. In general, regions with greater horizontal distance from a specified location on the screen space have higher x sampling factor, resulting in an increased pixel width relative to the region that includes the specified location. Regions with greater vertical distance from the specified location on the screen space have higher y sampling factor, resulting in an increased pixel height relative to the region that includes the specified location. Regions with greater horizontal and vertical distance from the specified location on the screen space have higher x sampling factor and higher y sampling factor, resulting in both an increased pixel width and height relative to the region that includes the specified location.

In some embodiments, the specified location may be the center of the screen space associated with the display screen. In other embodiments, the specified location may be a location on the screen space that is directly in line with the center of a corresponding distortion lens. This location may or may not be located at the center of the screen space. In yet other embodiments, the specified location may be an arbitrary location on the screen. In these latter embodiments, the specified location may be a fixation point related to foveated rendering. With foveated rendering, a fixation point may be established, where the fixation point may be specified by a pointer device, including, without limitation, a computer mouse or digital pen device. Alternatively, the fixation point may be determined via an eye tracking device that follows the location of the fovea, that is, the center of the retina, of the eye of the viewer. In these embodiments, the x sampling factor and y sampling factor may be based on the horizontal and vertical distance of a particular region from the fixation point.

In some embodiments, the x sampling factor and the y sampling factor may be x and y scale factors, respectively, that may specify the amount to scale vertices and corresponding geometry objects that intersect a particular region. In general, a new vertex position (x', y') may be specified as x'=f(x, y, z, w) and y'=f(x, y, z, w), indicating that the new vertex position is a function of the homogenous coordinates x, y, z, and w of the current vertex position. Any linear function of the homogenous coordinates x, y, z, and w may be utilized, whereby lines associated the current vertices of the geometry object are still lines after scaling the vertices to the new vertex positions. In one example, the new vertex position could be specified as x'=A*x and y'=B*y, where x and y specify the current vertex position, x' and y' specify the new vertex position, and A and B are horizontal and vertical scale factors, respectively.

In some embodiments, the x, y sampling factor and the x, y offset may be applied after the geometry objects have been clipped. In other embodiments, the x, y sampling factor and the x, y offset may be applied before the geometry objects have been clipped. Similarly, in some embodiments, the x, y sampling factor and the x, y offset may be applied after the homogenous coordinates x, y, z, and w have been normalized by dividing the coordinates by 'w.' In other embodiments, the x, y sampling factor and the x, y offset may be applied before the homogenous coordinates x, y, z, and w have been normalized by dividing the coordinates by 'w.'

In some embodiments, the x sampling factor may be the same for all regions in a particular column and the y sampling factor is the same for all regions in a particular row. In such embodiments, vertices may be aligned between one region and an adjacent region. As a result, geometry objects that intersect with multiple regions may be rendered without discontinuity or seams at the region boundary. In other embodiments, the x sampling factor may differ between one region and a vertically adjacent region, or the y sampling factor may differ between one region and a horizontally adjacent region. In such embodiments, vertices may not be aligned between one region and an adjacent region. As a result, geometry objects that intersect with multiple regions may be rendered with discontinuity, seams, or other artifacts at the region boundary. In these embodiments, interpolation and filtering may be applied at such region boundaries to reduce or eliminate such artifacts. The vertex processing unit 510 produces x, y attributes for each received vertex, and transmits the x, y attributes to the geometry processing unit 520.

The geometry processing unit 520 receives processed vertices from the vertex processing unit 510. In some embodiments, the geometry processing unit 520 may transmit replicated geometry objects via viewport multicasting. In such embodiments, the geometry processing unit 520 may draw a geometry object once and transmit instances of the geometry object to multiple viewports, where each viewport has a given x, y sampling factor and x, y offset as well as a scissor box that may define the portion of the screen space to draw for a particular viewport. The scene may be divided into multiple viewports, where each viewport corresponds to a different region of the screen space, as described herein. When the geometry processing unit 520 receives a geometry object, the geometry processing unit 520 may generate an intersection mask that causes the geometry object to be transmitted only to viewports that correspond to regions intersected by the geometry object. Alternatively, the geometry processing unit 520 may transmit the geometry object to all viewports without generating an intersection mask, and each viewport may determine whether to draw the geometry object based on whether the geometry object intersects the corresponding region in screen space.

The VPC 370 receives processed vertices and a scissor box for each viewport from the geometry processing unit 520. The VPC 370 may also receive an intersection mask from the geometry processing unit 520. If the VPC 370 receives an intersection mask from the geometry processing unit 520, then the VPC 370 generates an output vertex and a corresponding scissor box for each intersected viewport, as determined by the intersection mask. If the VPC 370 does not receive an intersection mask from the geometry processing unit 520, then the VPC 370 generates an output vertex a corresponding scissor box for every viewport. In some embodiments, the VPC 370 determines which regions interest with various geometry objects rather than the geometry processing unit 520.

The tiling unit 375 receives vertices and scissor boxes from VPC 370 and transmits vertices and scissor boxes to one or more setup units 380, as further described herein.

The setup unit (setup) 380 receives vertices and corresponding scissor boxes from the tiling unit 375. The setup unit 380 applies the scissor box to the vertex, to determine if all, part, or none of the geometry object corresponding the current vertex intersects with the viewport corresponding to the scissor box. The setup unit 380 computes and transmits linear plane equations and linear attribute edge equations to the rasterizer 385.

The rasterizer 385, a pixel shading unit 390, and ROP 395 perform their standard functions without specifically being aware of piecewise linear irregular rasterization. Because each region of screen space includes vertices aligned to a regular linear grid, the rasterizer 385, a pixel shading unit 390, and ROP 395 correctly and efficiently rasterize and shade the incoming vertices and pixels without modifying the standard functionality of these processing elements. These processing elements rely on a linear grid space for efficiency. Because the plane equations and edge equations generated by the setup unit 380 are linear, the rasterizer 385, a pixel shading unit 390, and ROP 395 maintain efficient processing. For example, the rasterizer 385 could perform operations using linear edge equations. One or more of rasterizer 385, a pixel shading unit 390, and ROP 395 could access attributes in shared memory based on linear plane equations.

As described above, each region in screen space with a different x, y sampling factor and x, y offset is associated with a different viewport. Consequently, each region in screen space corresponds to a different viewport. For example, in a system that includes 16 viewports, the screen space could be divided in any manner that does not exceed 16 regions. So, the screen space could be divided into regions of 2 rows of 8 columns, 3 rows of 5 columns, 4 rows of four columns. In some embodiments, viewports may be separable into separate x viewports and y viewports, such as 16 x viewports by 16 y viewports. In such embodiments, each region in screen space could be associated with two viewports—an x viewport and a y viewport. For example, a system with 16 x viewports by 16 y viewports would have 256 viewports in total. In other embodiments, regions may be defined using cache tiles rather than viewports. In such embodiments, each region in screen space may be associated with a different cache tile, where each cache tile represents a different 64 pixel by 64 pixel region in screen space, and each cache tile has a given x, y sampling factor and x, y, offset. In yet other embodiments, regions may be defined using either coarse raster tiles or fine raster tiles rather than viewports. In such embodiments, each region in screen space may be associated with a different coarse raster tile, where each cache tile represents a different 16 pixel by 16 pixel region in screen space, and each raster tile has a given x, y sampling factor and x, y, offset. Alternatively, each region in screen space may be associated with a different coarse raster tile, where each cache tile represents a different 8 sample by 8 sample region in screen space. By using cache tiles or raster tiles, rather than viewports, more regions in screen space can be defined. As a result, piecewise linear irregular rasterization using cache tiles or raster tiles may more closely approximate the ideal non-linear rasterization grid, as compared to the viewport approach.

In some embodiments, the elements in the graphics processing pipeline 350 may reverse the piecewise linear irregular plane equations back to a regular square grid before accessing certain attributes. For example, a texture in texture memory could be mapped to square pixels. An element accessing texture memory would reverse the piecewise linear irregular plane equations back to a regular square grid. The element would use the vertex position based on the reversed plane equations to access texture memory, in order to retrieve the correct texel.

FIGS. 6A-6D illustrate exemplary sample grids that may be implemented during piecewise irregular rasterization, according to various embodiments of the present invention.

Figure 6A:
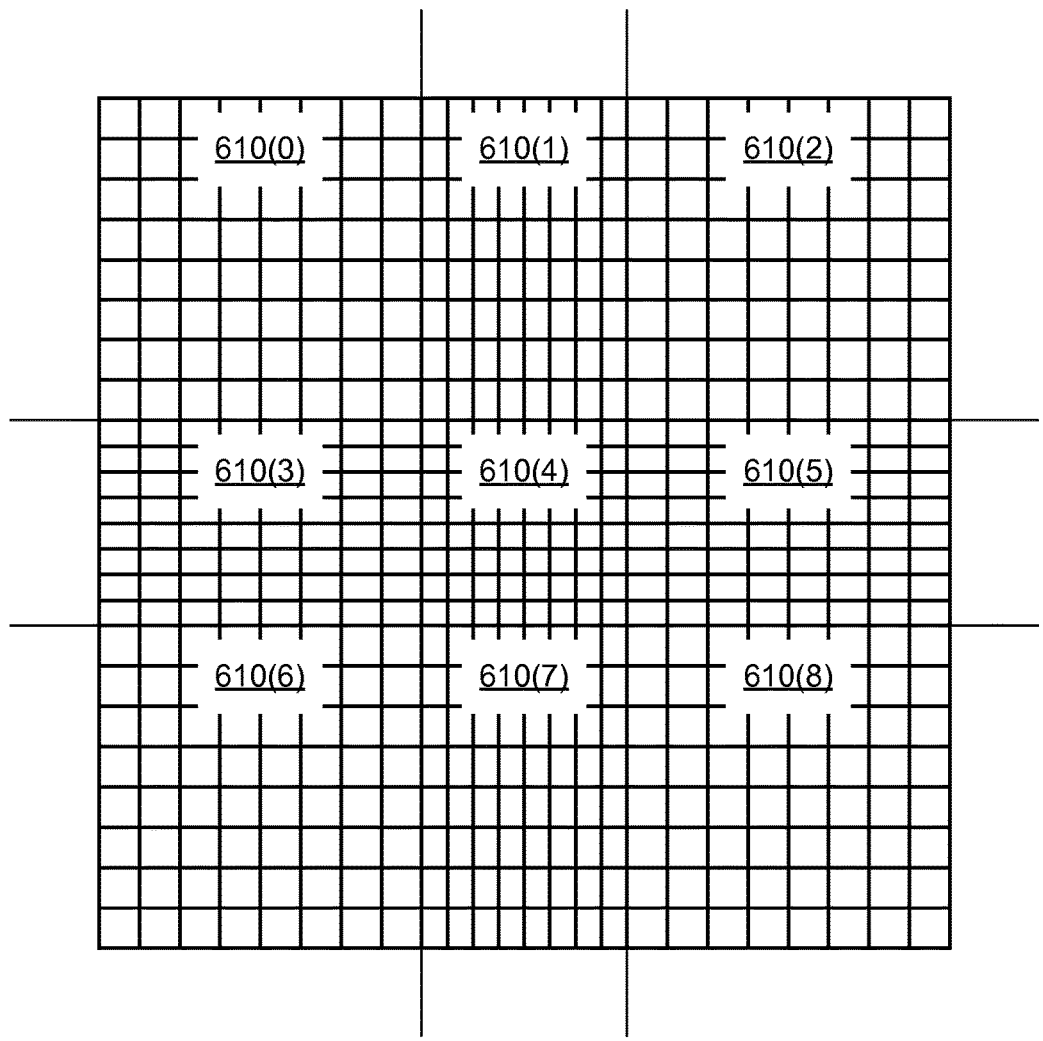
FIGS. 6A-6D illustrate exemplary sample grids that may be implemented during piecewise irregular rasterization, according to various embodiments of the present invention.

As shown in FIG. 6A, the sample grid includes nine regions 610(0)-610(8) arranged as three rows by three columns. Region 610(4), near the center of the screen space, includes square pixels at a relatively fine resolution. Regions 610(3) and 610(5), located at a horizontal distance from the center region 610(4), include pixels with greater horizontal spacing relative to the center region 610(4). Regions 610(1) and 610(7), located at a vertical distance from the center region 610(4), include pixels with greater vertical spacing relative to the center region 610(4). Regions 610(0), 610(2), 610(6), and 610(8), located at a horizontal and vertical distance from the center region 610(4), include pixels with greater horizontal spacing and greater vertical spacing relative to the center region 610(4). As shown, regions in the same column all have the same horizontal resolution, and regions in the same row all have the same vertical resolution.

Figure 6B:
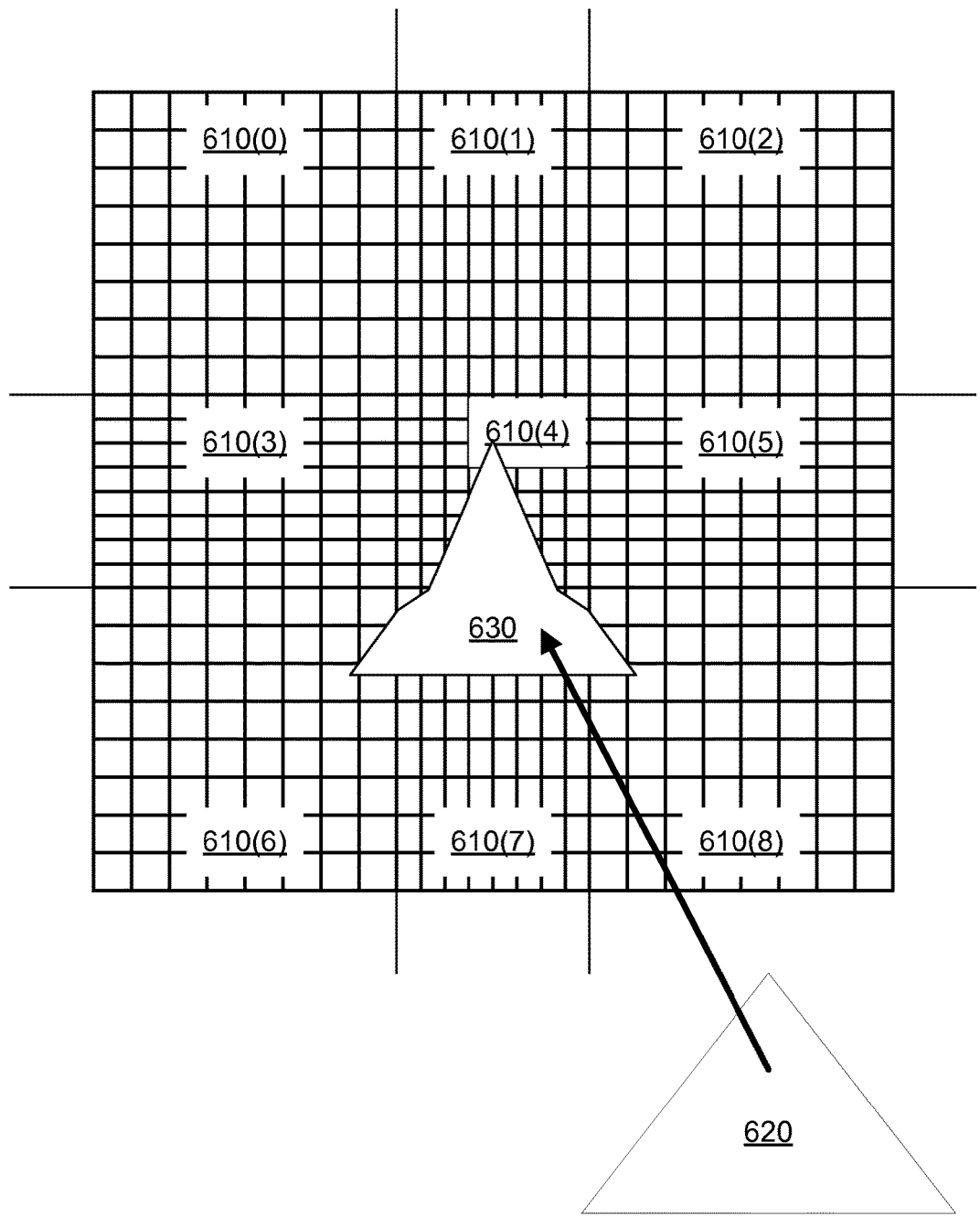

As shown in FIG. 6B, triangle 620 is to be rendered onto the screen space represented by regions 610(0)-610(8). Triangle 620 intersects with four regions 610(4), 610(6), 610(7), and 610(8). When rendered onto the piecewise linear irregular grid, triangle 620 appears as triangle 630, which shows discontinuity at the boundaries between adjacent regions. When projected into VR goggles, however, the distortion illustrated by triangle 630 and the optical distortion of the lenses in the VR goggles counteract each other, and the viewer sees a triangle that approximates triangle 620.

Figure 6C:
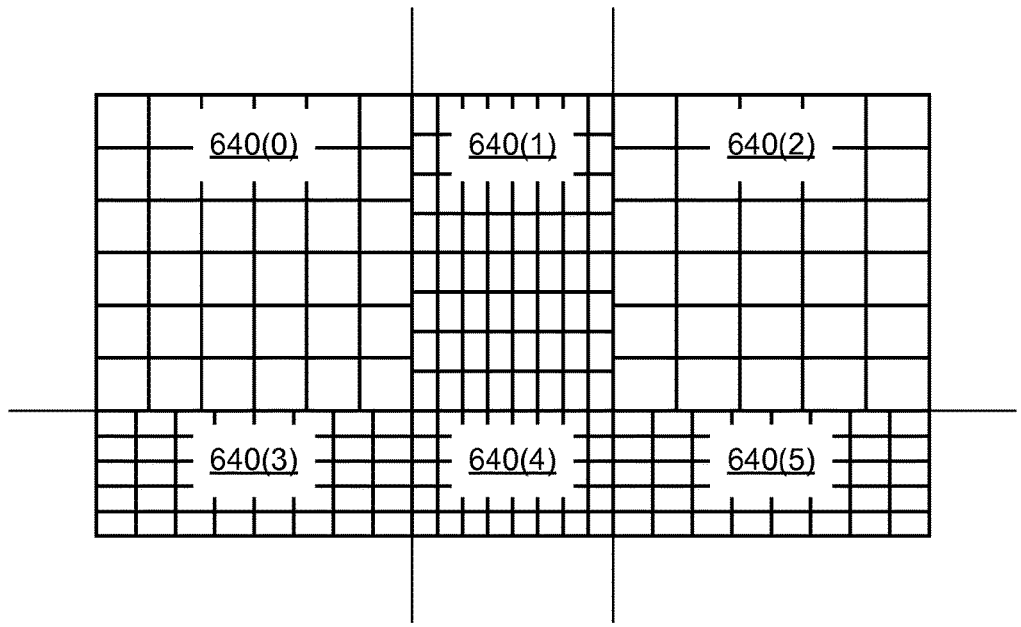

As shown in FIG. 6C, the sample grid includes six regions 640(0)-640(5) arranged as two rows by three columns. Region 640(4) includes 5 rows by 8 columns of square pixels at a relatively fine resolution. Regions 640(3) and 640(5), located at a horizontal distance from the center region 640(4), include pixels with greater horizontal spacing relative to region 640(4). Region 640(1), located at a vertical distance from region 640(4), includes pixels with greater vertical spacing relative to region 640(4). Regions 640(0) and 640(2), located at a horizontal and vertical distance from the center region 640(4), include pixels with greater horizontal spacing and greater vertical spacing relative to region 640(4). As shown, 640(0) and 640(2) have different horizontal and vertical resolutions relative to the immediately adjacent regions. Therefore, geometry objects that reside in one or both of regions 640(0) and 640(2) and an adjacent regions are likely to show discontinuity, seams, or other artifacts. Therefore, such geometry objects should be interpolated and filtered at region boundaries to reduce the effect of such artifacts.

Figure 6D:
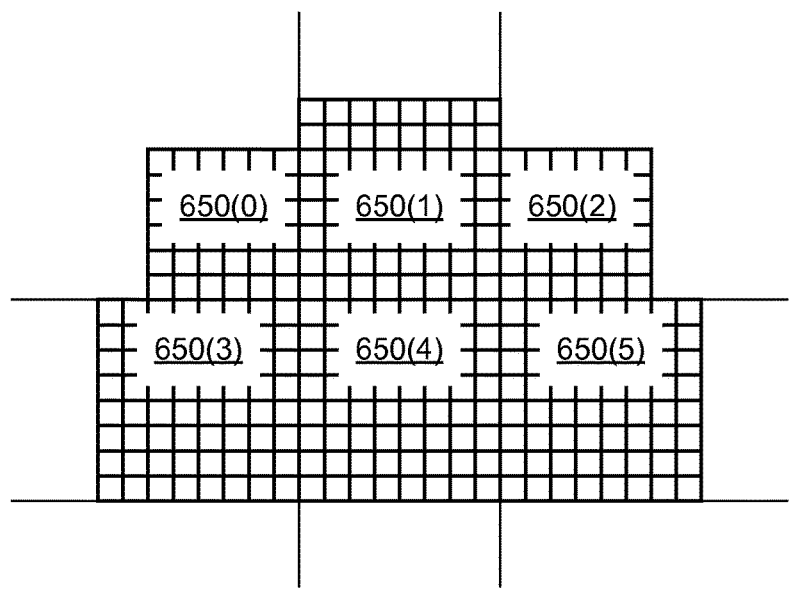

As shown in FIG. 6D, the sample grid includes six regions 650(0)-650(5) arranged as two rows by three columns. Regions 650(1), 650(3), 650(4), and 650(5) include 8 rows by 8 columns of square pixels. Regions 650(0) and 650(2) include 6 rows by 6 columns of square pixels. All regions six regions 650(0)-650(5) have the same horizontal and vertical resolution.

Figure 7:
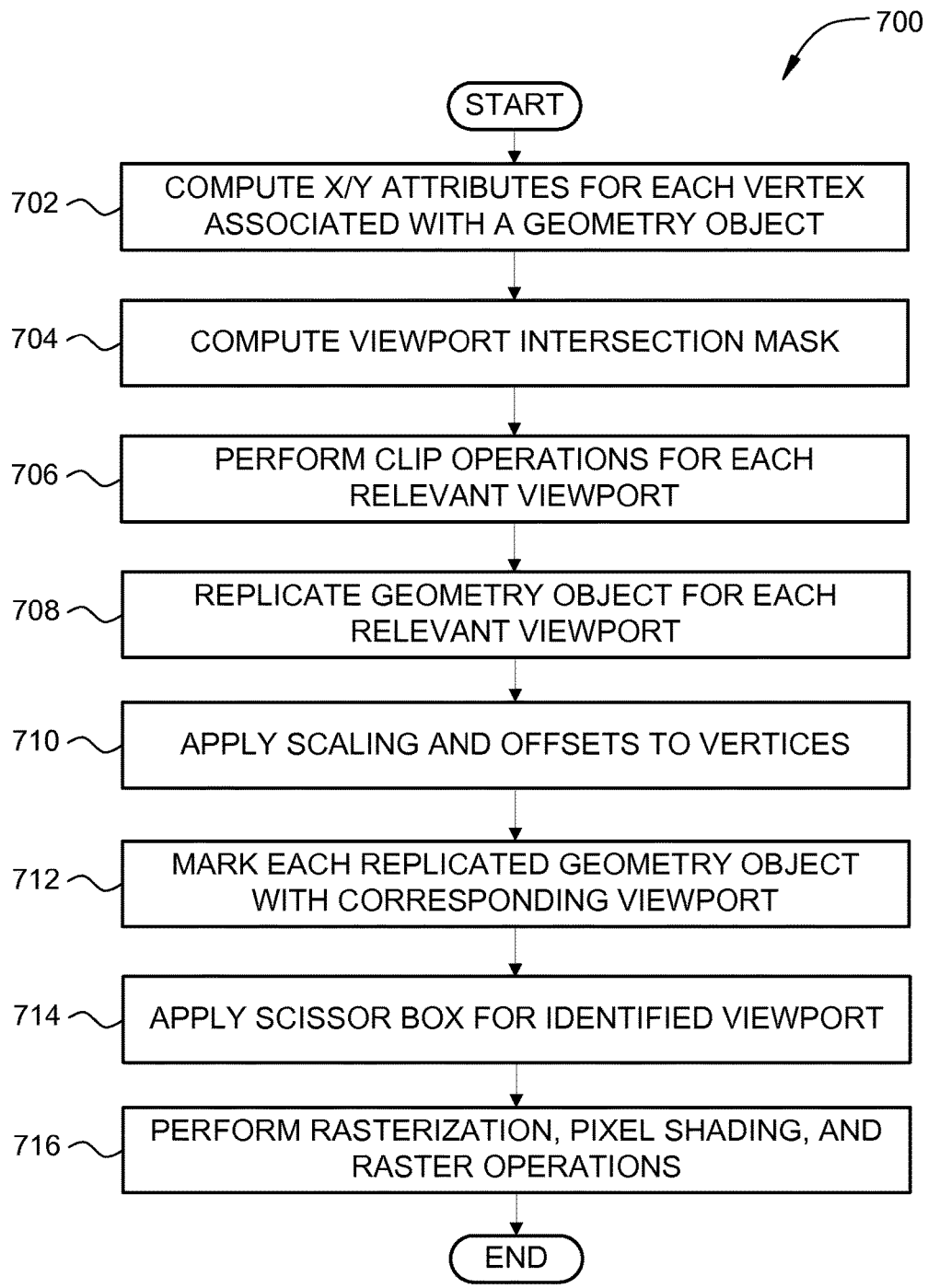
FIG. 7 sets forth a flow diagram of method steps for performing piecewise irregular rendering, according to one embodiment of the present invention.

FIG. 7 sets forth a flow diagram of method steps for performing piecewise irregular rendering, according to one embodiment of the present invention. Although the method steps are described in conjunction with the systems of FIGS. 1-6D, persons skilled in the art will understand that any system configured to perform the method steps, in any order, is within the scope of the present disclosure.

As shown, a method begins at step 702, where the vertex processing unit 510 computes x, y, attributes, including x, y sampling factor and x, y offset, for each received vertex. The computed x, y sampling factor and x, y offset places the received vertex, and the geometry object corresponding to the vertex, into the appropriate region of the screen space. Each region of the screen space is associated with a particular x and y sampling factor that define the horizontal and vertical resolution, respectively, of the region. Likewise, each region of the screen space is associated with a particular x and y offset that define the horizontal and vertical position, respectively, of the region. In general, different regions have different x, y sampling factors and x, y offsets so that the resolution of pixels can vary from region. In the case of rendering for VR goggles, regions near a specified location of the screen space have relatively fine resolution, in order to provide sufficient resolution when the regions near the specified location are magnified by the distortion lens. Regions that are distant horizontally from the specified location of the screen increases have correspondingly coarser resolution as the horizontal distance from the specified location of the screen increases. Likewise, regions that are distant vertically from the specified location of the screen increases have correspondingly coarser resolution as the vertical distance from the specified location of the screen increases. More generally, each region may be sized, scaled, and offset independently. As a result, various configurations of regions are possible via the disclosed techniques.

At step 704, the geometry processing unit 520 computes a viewport intersection mask for each vertex. The viewport intersection masks includes an indicator for each region, where the indicator for a particular region is set to TRUE when a particular geometry object intersects the region and is set to FALSE when the particular geometry object does not intersect the region. At step 706, the VPC 370 performs clip operations for each relevant viewports. In some embodiments, the relevant viewports are the viewports that intersect the geometry object corresponding to a particular vertex. In these embodiments, the VPC 370 scans the mask, and generates an instance of the geometry object for each region where the corresponding indicator in the viewport intersection mask is set to TRUE. In other embodiments, every viewport is considered to be a relevant viewport. In these latter embodiments, the geometry processing unit 520 may not generate a viewport intersection mask. In such embodiments, the VPC 370 may broadcast an instance of the geometry object to every viewport. The setup unit 380 may then clip or reject the triangle for those viewports not intersected by the triangle. These latter embodiments do not employ the geometry processing unit 520, thereby improving efficiency and performance of the graphics processing pipeline 350. Generating instances of geometry objects for regions that do not intersect the geometry object may slightly reduce efficiency for stages graphics processing pipeline 350 that are downstream from the geometry processing unit 520. However, these reductions in efficiency may be more than offset by increased efficiency from not employing the geometry processing unit 520 to generate viewport intersection masks.

At step 708, the VPC 370 replicates the geometry object for each relevant viewport. As described above, VPC 370 may generate instances of the geometry object only for the viewports that intersect the geometry object, where such viewports are the relevant viewports. Alternatively, the VPC 370 may generate instances of the geometry object and broadcast an instance for every viewport, where all viewports are considered as relevant viewports.

At step 710, the VPC 370 applies sampling factors and offsets to the vertices, thereby adjusting the vertex positions for each of the corresponding viewports. At step 712, the VPC 370 marks each replicated geometry object with the corresponding relevant viewport. This marking identifies each instance of the geometry object with the associated region, so that downstream stages of the graphics processing pipeline 350 correctly render each instance of the geometry object properly based on the corresponding x, y sampling factor and x, y offset for the region. At step 714, the setup unit 380 applies a scissor box for the identified viewport. Applying the scissor box causes only the portion of the geometry object that intersects a particular viewport to be rendered in that viewport. At step 716, the rasterizer 385, pixel shading unit 390, and ROP unit 395 perform their normal functions. As further described herein, the disclosed techniques provide linear plane equations and edge equations for each viewport. So long as the plane equations and edge equations remain linear, the rasterizer 385, pixel shading unit 390, and ROP unit 395 do not need any special programming or functional changes to correctly render the instances of the geometry for the various viewports. The method 700 then terminates.

In sum, 3D computer geometry objects are rendered for wide-screen applications, such as VR goggles, using piecewise irregular rasterization. The screen space of the display screen is divided up into multiple regions, where each region is associated with a particular x, y sampling factor and x, y offset. Geometry objects that cover pixels in one or more screen space regions are rendered according to the x, y sampling factor and x, y offset for the particular regions that intersect with the geometry object. For example, a geometry objects that covers three screen space regions could be rendered at one x, y sampling factor and x, y offset in the first region, another x, y sampling factor and x, y offset in the second region, and yet another x, y sampling factor and x, y offset in the third region. For wide-screen rendering, regions located near a specified location of the screen space could have relatively small square pixels. For regions located away from the specified location, where high resolution is typically not necessary, the x sampling factor could increase as the horizontal distance from the specified location increases, and the y sampling factor could increase as the vertical distance from the specified location increases.

At least one advantage of the disclosed approach is that pixels located near the edge of the screen space are rendered at lower resolution, leading to improved performance relative to prior wide-screen rendering techniques. Another advantage of the disclosed technique is that pixels located near a specified location of the screen space are rendered at higher resolution relative to previous techniques, leading to improved video quality near the specified location of the screen space relative to prior wide-screen rendering techniques.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method for rendering a geometry object in a computer-generated scene, the method comprising:
   dividing a screen space associated with a display screen into a plurality of regions that are arranged in a set of rows and a set of columns;
   for each region:
      computing a first sampling factor in a horizontal dimension that represents a horizontal sampling factor for pixels located in the region,
      computing a second sampling factor in a vertical dimension that represents a vertical sampling factor for the pixels located in the region,
      computing a first offset in the horizontal dimension that represents a horizontal position associated with the region, and
      computing a second offset in the vertical dimension that represent a vertical position associated with the region;
   determining that the geometry object intersects more than one region;
   generating a first instance of the geometry object for a first region that the geometry object intersects; and
   generating a second instance of the geometry object for a second region that the geometry object intersects,
   wherein the first region and the second region are included in a same row and have a different screen space size in the vertical dimension, and the first region and a third region are included in a same column and have a different screen space size in the horizontal dimension.

2. The method of claim 1, wherein the first instance is associated with a first scissor box and the second instance is associated with a second scissor box, and further comprising:
   applying the first sampling factor, the first offset, the second sampling factor, and the second offset associated with the first region to the first instance;
   applying the first scissor box to the first instance;
   applying the first sampling factor, the first offset, the second sampling factor, and the second offset associated with the second region to the second instance; and
   applying the second scissor box to the second instance.

3. The method of claim 1, wherein the first sampling factor for the first region is based on horizontal distance of the first region from a location on the screen space, the second sampling factor for the first region is based on vertical distance of the first region from the location on the screen space, the first sampling factor for the second region is based on horizontal distance of the second region from the location on the screen space, and the second sampling factor for the second region is based on vertical distance of the second region from the location on the screen space.

4. The method of claim 3, wherein the location on the screen space corresponds to a center of a lens associated with the display screen.

5. The method of claim 1, further comprising generating a mask indicating that the first region and the second region intersect the geometry object.

6. The method of claim 1, wherein each region included in the plurality of regions is associated with a different viewport in a plurality of viewports.

7. The method of claim 1, wherein the first region is associated with a first horizontal viewport in a plurality of horizontal viewports and a first vertical viewport in a plurality of vertical viewports, and the second region is associated with a second horizontal viewport in the plurality of horizontal viewports and a second vertical viewport in the plurality of vertical viewports.

8. The method of claim 1, wherein each region in the plurality of regions is associated with a different cache tile included in a plurality of cache tiles.

9. The method of claim 1, wherein each region in the plurality of regions is associated with a different raster tile included in a plurality of raster tiles.

10. The method of claim 1, wherein the regions included in the plurality of regions are arranged in a set of rows and a set of columns, and wherein each region included in a given row has a same second sampling factor, and each region included in a given column has a same first sampling factor.

11. The method of claim 1, wherein the first sampling factor comprises a first scaling factor that specifies a first multiplier that is applied to an 'x' coordinate of each vertex associated with the geometry object and the second sampling factor comprises a second scaling factor that specifies a second multiplier that is applied to a 'y' coordinate of each vertex associated with the geometry object.

12. A non-transitory computer-readable storage medium including instructions that, when executed by a processor, cause the processor to render a geometry object in a computer-generated scene, by performing the steps of:
dividing a screen space associated with a display screen into a plurality of regions that are arranged in a set of rows and a set of columns;
for each region:
computing a first sampling factor in a horizontal dimension that represents a horizontal sampling factor for pixels located in the region,
computing a second sampling factor in a vertical dimension that represents a vertical sampling factor for the pixels located in the region,
computing a first offset in the horizontal dimension that represents a horizontal position associated with the region, and
computing a second offset in the vertical dimension that represent a vertical position associated with the region;
determining that the geometry object intersects more than one region;
generating a first instance of the geometry object for a first region that the geometry object intersects; and
generating a second instance of the geometry object for a second region that the geometry object intersects,
wherein the first region and the second region are included in a same row and have a different screen space size in the vertical dimension, and the first region and a third region are included in a same column and have a different screen space size in the horizontal dimension.

13. The non-transitory computer-readable storage medium of claim 12, wherein the first instance is associated with a first scissor box and the second instance is associated with a second scissor box, and further including instructions that, when executed by the processor, cause the processor to perform the steps of:
applying the first sampling factor, the first offset, the second sampling factor, and the second offset associated with the first region to the first instance;
applying the first scissor box to the first instance;
applying the first sampling factor, the first offset, the second sampling factor, and the second offset associated with the second region to the second instance; and
applying the second scissor box to the second instance.

14. The non-transitory computer-readable storage medium of claim 12, wherein the first sampling factor for the first region is based on horizontal distance of the first region from a location on the screen space, the second sampling factor for the first region is based on vertical distance of the first region from the location on the screen space, the first sampling factor for the second region is based on horizontal distance of the second region from the location on the screen space, and the second sampling factor for the second region is based on vertical distance of the second region from the location on the screen space.

15. The non-transitory computer-readable storage medium of claim 12, further including instructions that, when executed by the processor, cause the processor to perform the step of generating a mask indicating that the first region and the second region intersect the geometry object.

16. The non-transitory computer-readable storage medium of claim 12, wherein each region included in the plurality of regions is associated with a different viewport in a plurality of viewports.

17. A graphics processing pipeline, comprising:
a vertex processor configured to:
divide a screen space associated with a display screen into a plurality of regions that are arranged in a set of rows and a set of columns;
for each region:
compute a first sampling factor in a horizontal dimension that represents a horizontal sampling factor for pixels located in the region,
compute a second sampling factor in a vertical dimension that represents a vertical sampling factor for the pixels located in the region,
compute a first offset in the horizontal dimension that represents a horizontal position associated with the region, and
compute a second offset in the vertical dimension that represent a vertical position associated with the region; and
a viewport scale, cull, and clip processor configured to:
determine that the geometry object intersects more than one region;
generate a first instance of the geometry object for a first region that the geometry object intersects; and
generate a second instance of the geometry object for a second region that the geometry object intersects,
wherein the first region and the second region are included in a same row and have a different screen space size in the vertical dimension, and the first region and a third region are included in a same column and have a different screen space size in the horizontal dimension.

18. The graphics processing pipeline of claim 17, wherein the first instance is associated with a first scissor box and the second instance is associated with a second scissor box, wherein the viewport scale, cull, and clip processor is further configured to:
apply the first sampling factor, the first offset, the second sampling factor, and the second offset associated with the first region to the first instance; and
apply the first sampling factor, the first offset, the second sampling factor, and the second offset associated with the second region to the second instance, and
the graphics processing pipeline further comprises a setup processor configured to:
apply the first scissor box to the first instance, and
apply the second scissor box to the second instance.

19. The graphics processing pipeline of claim 17, wherein the first sampling factor for the first region is based on horizontal distance of the first region from a location on the screen space, the second sampling factor for the first region is based on vertical distance of the first region from the location on the screen space, the first sampling factor for the second region is based on horizontal distance of the second region from the location on the screen space, and the second sampling factor for the second region is based on vertical distance of the second region from the location on the screen space.

\* \* \* \* \*